United States Patent
Lee et al.

(10) Patent No.: US 7,442,435 B2
(45) Date of Patent: Oct. 28, 2008

(54) LONG-FIBER-REINFORCED POLYPROPYLENE COMPOSITIONS AND DOOR SHIELD MODULE PLATE PRODUCED WITH THE SAME

(75) Inventors: Jae Shik Lee, Cheonan-si (KR); Joo Hong Kim, Chungju-si (KR); Min Ho Choi, Gwangmyeong-si (KR)

(73) Assignees: Hyundai Motor Company, Seoul (KR); Sambark Lft Co., Ltd., Asan-si, Chungcheongnam-do (KR)

( * ) Notice: Subject to any disclaimer, the term of this patent is extended or adjusted under 35 U.S.C. 154(b) by 0 days.

(21) Appl. No.: 11/305,727

(22) Filed: Dec. 15, 2005

(65) Prior Publication Data
US 2007/0087193 A1    Apr. 19, 2007

(30) Foreign Application Priority Data
Oct. 17, 2005    (KR) .................... 10-2005-0097533

(51) Int. Cl.
*B32B 27/04*    (2006.01)
*B32B 27/12*    (2006.01)
*B60C 1/00*    (2006.01)
*C08L 51/00*    (2006.01)
*C08L 53/00*    (2006.01)

(52) U.S. Cl. .............. 428/297.4; 428/299.1; 428/299.4; 524/494; 524/504; 524/505

(58) Field of Classification Search ................ 524/494, 524/504, 505; 428/364, 373, 394, 297.4, 428/299.1, 299.4
See application file for complete search history.

(56) References Cited

U.S. PATENT DOCUMENTS

| 5,985,971 A | 11/1999 | Srinivasan et al. | |
| 6,627,692 B2* | 9/2003 | Saito et al. | 524/494 |
| 6,747,094 B2 | 6/2004 | Kinoshita et al. | |
| 2006/0135699 A1* | 6/2006 | Li et al. | 525/240 |

FOREIGN PATENT DOCUMENTS

JP    2003-147159    5/2003

* cited by examiner

*Primary Examiner*—Lynda Salvatore
(74) *Attorney, Agent, or Firm*—Morgan Lewis & Bockius LLP

(57) ABSTRACT

The present invention provides long-fiber reinforced polypropylene compositions comprising: (a) about 29-77 wt % of a crystalline polypropylene resin comprising about 50-100 wt % of a propylene homopolymer; (b) about 20-50 wt % of a long-fiber reinforcing material having an average fiber length of about 3-50 mm and an average diameter of about 4-30 μm; (c) about 2-20 wt % of an elastomer, a plastomer, or a mixture thereof having a melt index as measured at 190° C. of about 20-150 g/10 min, wherein said elastomer, plastomer, or mixture thereof was polymerized by a metallocene-based catalyst; and (d) about 0.01-3 wt % of a radical initiator, wherein the ratio of the melt index as measured at 230° C. of the crystalline polypropylene resin to the melt index as measured at 190° C. of the elastomer, the plastomer, or the mixture thereof is in the range of about 0.5 to about 10.

12 Claims, 2 Drawing Sheets

FIG. 2: Polypropylene-based Long-fiber-reinforced Compositions and their Performance Test Results

| | (A) Crystalline propylene resin (wt%) | | | | (B) Long-fiber reinforcing material (wt%) | (C) Elastomer and/or plastomer (wt%) | | | | (D) Radical initiator (wt%) | Melt index ratio MI(A)/MI(C) | Modifiers (wt%) | Fiber length (mm) | Performance test | | Test standard [RMC M5] | |
|---|---|---|---|---|---|---|---|---|---|---|---|---|---|---|---|---|---|
| | Propylene homopolymer(1) | Propylene ethylene modified copolymer(2) | Propylene modified copolymer(2)(3) | (1)+(2)+(3) MI at 230°C | | EPM rubber or EPDM rubber | Elastomer prepared by metallocene catalysis (1) | Plastomer prepared by metallocene catalysis (2) | (1)+(2) MI at 190°C | | | | | Impact energy (Joule) | Deformation (mm) | Deformation Less than 2.0 mm | Impact energy 20 J or larger |
| Example 1 | 39.6 | 9 | | 100 | 40 | | 9 | | 40 | 0.3 | 2.5 | 1.9 | 12 | 23.8 | 1.3 | PASS | PASS |
| Example 2 | 39.6 | 9 | | 80 | 40 | | 9 | | 90 | 0.5 | 0.9 | 1.9 | 12 | 25.2 | 1.3 | PASS | PASS |
| Example 3 | 44.8 | 6 | | 20 | 40 | | 6 | | 40 | 1.0 | 0.5 | 1.9 | 12 | 22.4 | 1.2 | PASS | PASS |
| Example 4 | 44.8 | 6 | | 60 | 40 | | 3 | 3 | 40 | 0.6 | 0.7 | 1.9 | 12 | 21 | 1.2 | PASS | PASS |
| Example 5 | 54.8 | 6 | | 60 | 30 | | 6 | | 40 | 0.6 | 1.5 | 1.9 | 12 | 25.2 | 1.5 | PASS | PASS |
| Example 6 | 34.8 | 6 | | 60 | 50 | | 6 | | 40 | 0.6 | 1.5 | 1.9 | 12 | 21.7 | 1.0 | PASS | PASS |
| Example 7 | 39.6 | 9 | | 100 | 40 | | 9 | | 40 | 0.3 | 2.5 | 1.9 | 8 | 22.4 | 1.3 | PASS | PASS |
| Example 8 | 39.6 | 4.5 | 4.5 | 100 | 40 | | 9 | | 40 | 0.5 | 2.5 | 1.9 | 8 | 23.1 | 1.3 | PASS | PASS |
| Example 9 | 36.9 | 6 | | 80 | 40 | | 15 | | 90 | 0.2 | 0.7 | 1.9 | 12 | 28 | 1.7 | PASS | PASS |
| Example 10 | 39.6 | 9 | | 200 | 40 | | 9 | | 20 | 0.1 | 10.0 | 1.9 | 12 | 23.1 | 1.4 | PASS | PASS |
| Comp. Example 1 | 40.1 | 9 | | 3 | 40 | | | | 10 | | 0.3 | 1.9 | 0.7 | 6.3 | 3.5 | FAIL | FAIL |
| Comp. Example 2 | 55.1 | 3 | | 100 | 40 | | | | | | 20.0 | 1.9 | 12 | 9.8 | 2.5 | FAIL | FAIL |
| Comp. Example 3 | 44.8 | 6 | | 100 | 40 | 6 | | | 5 | | 20.0 | 1.9 | 12 | 16.1 | 1.8 | FAIL | PASS |
| Comp. Example 4 | 54.8 | 6 | | 100 | 30 | 6 | | | 5 | | 20.0 | 1.9 | 0.65 | 5.6 | 4.0 | FAIL | FAIL |
| Comp. Example 5 | 39.6 | 9 | | 100 | 40 | | 9 | | 11 | 0.5 | 9.1 | 1.9 | 12 | 16.8 | 2.6 | FAIL | FAIL |
| Comp. Example 6 | 39.6 | 9 | | 320 | 40 | | 9 | | 25 | 0.5 | 12.8 | 1.9 | 12 | 14 | 2.0 | FAIL | PASS |
| Comp. Example 7 | 39.6 | 9 | | 100 | 40 | | 9 | | 40 | 0.0 | 2.5 | 1.9 | 12 | 16.8 | 2.7 | FAIL | FAIL |
| Comp. Example 8 | 39.6 | 9 | | 100 | 40 | | 9 | | 40 | 3.2 | 2.5 | 1.9 | 12 | 13.3 | 2.9 | FAIL | FAIL |
| Comp. Example 9 | 29 | 6 | | 60 | 40 | | 25 | | 90 | 1.0 | 0.7 | 1.9 | 12 | 22.4 | 3.5 | PASS | FAIL |

US 7,442,435 B2

LONG-FIBER-REINFORCED POLYPROPYLENE COMPOSITIONS AND DOOR SHIELD MODULE PLATE PRODUCED WITH THE SAME

CROSS REFERENCE TO RELATED APPLICATIONS

This application claims priority of Korean Application No. 10-2005-0097533, filed Oct. 17, 2005, with the Korean Intellectual Property Office, the disclosure of which is fully incorporated herein by reference.

FIELD OF THE INVENTION

The present invention relates generally to long-fiber-reinforced polypropylene compositions and articles produced therefrom. More specifically, the present invention relates to long-fiber-reinforced polypropylene compositions having improved impact resistance and rigidity and door modules produced therefrom.

BACKGROUND OF THE INVENTION

The development of lightweight materials has gained increasing significance as car manufacturers strive to reduce vehicle weight in order to improve performance, lower fuel and oil consumption, and reduce emissions. To meet demands for weight reduction, and system consolidation in automotive vehicles, a one-piece door module was developed which integrates the window regulator, door motor, regulator channel, inside handle, speaker, door wire harness clip, etc., into a single unit. The manufacturing of a one-piece door module replaces conventional methods of door assembly, resulting in a much more streamlined process and improved productivity.

The technique mentioned above is evolving from part-by-part modulation for individual major parts to plate modulation, in which all parts are integrated into a steel plate. The present invention purports to replace the steel employed in the plate modulation with a lightweight plastic and provides a long-fiber reinforced polypropylene composition suitable for the purpose.

Polypropylene is widely used because of its superior chemical resistance and good moldability. However, it has poor thermal resistance and mechanical strength, and thus cannot be used for certain parts that require robust mechanical properties or thermal resistance. To overcome this problem, various kinds of organic or inorganic materials have been used to reinforce a polypropylene resin. For example, mechanical properties and thermal resistance of a polypropylene resin can be improved by mixing the polypropylene resin with glass fiber using such mixing apparatus as an extruder. However, the amount of improvement in rigidity is slight since most of the glass fiber is substantially cut up by the screw or other part of the mixing apparatus and reduced to short fragments of about 0.7 mm or smaller before being mixed in with the polypropylene resin.

There is increasing demand in the automotive and electronic industries for a polypropylene resin with good impact resistance and good rigidity. However, such need cannot be satisfied by the aforementioned short-fiber-reinforced polypropylene resin. To this end, several methods have been proposed in the art. For example, one method involves unraveling a fiber bundle from a fiber filaments cluster or a composite cluster of polypropylene and non-polypropylene fiber filaments followed by impregnating and/or coating the unraveled fiber filaments with polypropylene. Various other techniques are also known in the art. These include heating fiber filaments while adhering a powdery polypropylene suspension to the fiber filaments, impregnating polypropylene by contacting a melt resin to a fiber filaments, adhering polypropylene powder to a charged fiber filaments and heating it to impregnate the polypropylene, impregnating a polypropylene resin dissolved in a solvent to a fiber filaments and removing the solvent to obtain a polypropylene long-fiber reinforced resin in which each fine fiber filament is encoated with polypropylene. Long-fiber reinforced molding products produced from these matrix resins have been shown to demonstrate good mechanical strength and, in particular, impact strength.

WO 1996-006132, U.S. Pat. No. 5,985,971, Dave et al. (1996) *Journal of Vinyl & Additive Technology* vol. 2, No. 3 and Martinez Burgos et al. (2003) *Journal of Polymer Science Part B: Polymer Physics* 41(11): 1244 disclose compositions comprising fiber-reinforced polypropylene elastomers prepared by metallocene-catalyzed polymerization. These methods and compositions have however several drawbacks however; the mixing process by screw extrusion or kneading takes at least 30 sec and the resultant compositions exhibit very low rigidity albeit improved impact resistance. Moreover, the compositions of WO 1996-006132 and U.S. Pat. No. 5,985,971 have a very low glass fiber content (1-10 wt %) and the glass fibers that are present are not readily compatible with resin.

U.S. Pat. No. 6,747,094 discloses the use of a crosslinkable ethylene-octene or ethylene-butene rubber prepared using metallocene catalysts and having a diene moiety. Although this technique is effective in improving impact resistance, the rigidity and flow property of the resultant composition worsen considerably as the resin penetrates into the layer of long-fiber filaments within a short time, thereby making impregnation very difficult.

Korean Patent Publication No. 10-2001-0051300, Japanese Patent No. Hei 10-377454, Japanese Patent No. 2000-328717, Japanese Patent No. 2001-32050, U.S. Pat. Nos. 5,409,763 and 5,866,648 disclose methods of adding a non-olefinic resin with high rigidity to a polyolefin-based resin and/or forming an alloy. Most of the methods either form an alloy of polyamide with a polypropylene resin or improve physical properties of the polypropylene-based resin using polyethylene terephthalate, polybutylene terephthalate, polyoxymethylene, polyphenlyene sulfide, styrene/acrylonitrile copolymer, acrylobutadiene-styrene copolymer, polycarbonate, polymethyl methacrylate, etc. However, none of these compositions demonstrate a high level of resistance to damage from external impact or superior rigidity when subject to an external load as do the compositions of the present invention.

SUMMARY OF THE INVENTION

The present invention provides long-fiber reinforced polypropylene compositions with superior resistance to damage from external impact and superior rigidity when subject to external load. Such compositions are useful in the production of lightweight and durable automobile parts, such as the door module provided by the present invention, which exhibits great impact resistance and superior rigidity, and effectively lower susceptibility to damage or deformation caused by external impact or load.

The long-fiber reinforced polypropylene composition of the present invention comprises: (a) about 29-77 wt % of a crystalline polypropylene resin comprising about 50-100 wt % of a propylene homopolymer; (b) about 20-50 wt % of a long-fiber reinforcing material having an average fiber length of about 3-50 mm and an average diameter of about 4-30 μm; (c) about 2-20 wt % of an elastomer, a plastomer, or a mixture thereof having a melt index as measured at 190° C. of about 20-150 g/10 min, wherein said elastomer, plastomer, or mixture thereof was polymerized by a metallocene-based catalyst; and (d) about 0.01-3 wt % of a radical initiator, wherein the ratio of the melt index as measured at 230° C. of the crystalline polypropylene resin to the melt index as measured at 190° C. of the elastomer, the plastomer, or the mixture thereof is in the range of about 0.5 to about 10.

BRIEF DESCRIPTION OF THE DRAWINGS

FIG. 2 is a table of long-fiber-reinforced polypropylene compositions and their performance test results.

DETAILED DESCRIPTION OF THE PREFERRED EMBODIMENTS

Figure 1:
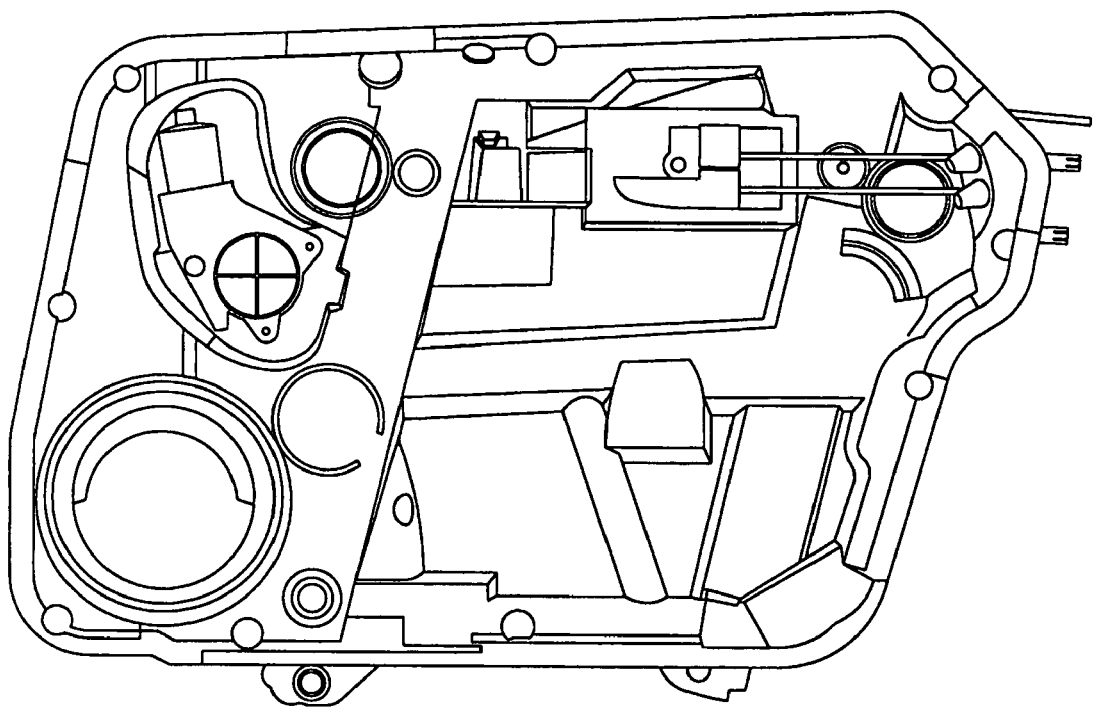
FIG. 1 is a schematic view of a door module produced by injection-molding the long-fiber reinforced polypropylene composition of the present invention.

The present invention relates to a long-fiber reinforced polypropylene composition comprising (a) about 29-77 wt % of a crystalline polypropylene resin comprising about 50-100 wt % of a propylene homopolymer; (b) about 20-50 wt % of a long-fiber reinforcing material having an average fiber length of about 3-50 mm and an average diameter of about 4-30 μm; (c) about 2-20 wt % of an elastomer, a plastomer, or a mixture thereof having a melt index as measured at 190° C. of about 20-150 g/10 min, wherein said elastomer, plastomer, or mixture thereof was polymerized by a metallocene-based catalyst and; and (d) about 0.01-3 wt % of a radical initiator, wherein the ratio of the melt index as measured at 230° C. of the crystalline polypropylene resin to the melt index as measured at 190° C. of the elastomer, the plastomer, or the mixture thereof is in the range of about 0.5 to about 10.

The present invention also relates to a door module produced by melting and processing the long-fiber reinforced polypropylene composition.

In preferred embodiments of the present invention, the crystalline polypropylene resin or component (a) is prepared by Ziegler-Natta polymerization. It may comprise solely of a propylene homopolymer or a mixture of a propylene homopolymer and a propylene-ethylene copolymer. Preferably, the long-fiber reinforced polypropylene composition of the present invention comprises about 29-77 wt % of the crystalline polypropylene resin. When the content of crystalline polypropylene resin in the composition is less than about 29 wt %, its effect of affording rigidity to the composition is unsatisfactory. In contrast, when the content of crystalline polypropylene resin in the composition exceeds about 77 wt %, the impact resistance of the composition produced is negatively affected. In light of the above, the appropriate content of crystalline polypropylene resin can be varied by one of skill in the art.

If a mixture of a propylene homopolymer and a propylene-ethylene copolymer is employed as component (a), the mixture should preferably comprise at least 50 parts by weight of propylene homopolymer. Otherwise, the rigidity of the composition produced therefrom may not be satisfactory. Theoretically, any type of propylene-ethylene copolymer, e.g. a block copolymer, a random copolymer, or a graft copolymer, can be used to practice the present invention. Preferably, a block copolymer that is well-balanced in both impact resistance and rigidity is selected.

In preferred embodiments of the present invention, the crystalline polypropylene resin has a melt index as measured at 230° C. of about 10-300 g/10 min, preferably about 50-300 g/10 min, and most preferably about 100-300 g/10 min. A melt index below about 10 g/10 min will yield unsatisfactory flow properties, making impregnation of the resin between long-fiber filaments a difficult and inefficient process. In contrast, a melt index in excess of about 300 g/10 min will produce a composition with poor physical properties. In light of the above, the appropriate melt index for use in practicing the present invention can be readily determined by one of skill in the art.

To improve compatibility of the crystalline polypropylene resin with the long-fiber reinforcing material and the elastomer and/or plastomer, all or part of the crystalline polypropylene resin may be modified with an unsaturated carboxylic acid, an acid anhydride thereof or an organosilane compound. Preferably, the modifying agent is one selected from a group consisting of aminosilane, epoxysilane, vinylsilane, methacryloxysilane, acrylic acid, methacrylic acid, maleic acid, itaconic acid, maleic anhydride, itaconic anhydride, citraconic anhydride, methyl acrylate, monomethyl maleate, acrylic acid amide, fumaric acid monoamide, amide, itaconic acid imide, and mixtures thereof.

Additional components that can be included in the long-fiber-reinforced polypropylene composition of the present invention are, without limitation, common dispersing agents, inorganic coating agents, organic-inorganic coupling agents, crosslinking agents, thermal stabilizers, antioxidants, hydrolysis stabilizers, lubricants, interfacial binding aides, UV stabilizers, photostabilizers, antifriction components, slip/release agents, impact reinforcing agents, colorants such as pigments or dyes, deformation retardants, anti-wear agents, hardness enhancers, nucleating agents, transparency enhancers, brighteners, flame retardants, noise/vibration retardants, thermal aging retardants, specific gravity controllers, foaming agents, fillers, etc. Some of these may be used to improve the compatibility of the elastomer and/or the plastomer with the crystalline polypropylene resin, attain finer dispersion, or improve specific properties of the resin, such as porosity, etc. In particular, a filler, which can be planar, spherical, or needle-shaped, may be added to reduce production cost. Examples of planar and spherical fillers which can be employed include talc, mica, calcium carbonate, glass bead and glass flake. Examples of needle-shaped fillers include, without limitation, chopped glass fiber, powdered glass fiber and wollastonite.

In preferred embodiments of the present invention, the long-fiber reinforcing material or component (b) is provided as a cluster of about 500-10,000 fiber filamentss with an average fiber length of about 2-50 mm and an average diameter of about 4-30 μm. The long-fiber reinforced polypropylene composition of the present invention should preferably comprise about 20-50 wt % of component (b). If the content of the long-fiber reinforcing material is too low, i.e. less than about 20 wt %, rigidity and impact resistance characteristics of the composition produced therefrom will be unsatisfactory. In contrast, if the content of the long-fiber reinforcing material is too high, i.e. exceeds about 50 wt %, the amount of fiber filaments becomes too excessive for efficient impregnation by components (a) and (c). In light of the above, the appropriate content of long-fiber reinforcing material can be varied by. one of skill in the art.

In order to improve compatibility with the polypropylene resin, the fiber filaments of the long-fiber reinforcing material is preferably surface-treated with silane or titanate. Even more preferably, an aminosilane, amidesilane, epoxysilane, azidesilane, or acrylsilane, etc. is used for surface-treating the long-fiber reinforcing material. The fiber filaments may be inorganic and/or organic fiber filaments. Because each type of fiber filament has its own specific advantages and properties, a suitable one may be selected by one of skill in the art depending on the intended usage of the final product. Preferably in view of cost and performance, glass fiber filaments, carbon fiber filaments, graphite fiber filaments, metal fiber filaments, aramid fiber filaments, ultra high molecular weight polyethylene fiber filaments, polyacrylonitrile fiber filaments, arylate fiber filaments or polyether ether ketone fiber filaments can be used for the present invention. A more environmentally-friendly alternative is natural fiber, which can be used alone or in combination with other types of fibers.

In preferred embodiments of the present invention, the elastomer and/or the plastomer, otherwise referred herein as component (c), is polymerized by a metallocene-based catalyst using single-site catalysis. The elastomer and/or plastomer should preferably have a very narrow molecular weight distribution with the ratio of weight-average molecular weight ($M_w$) to number-average molecular weight ($M_n$) approximating 3 or less. Preferably, the elastomer, plastomer, or mixture thereof is selected to be an ethylene elastomer and/or an ethylene plastomer having excellent flow property with a melt index as measured at 190° C. of about 20-150 g/10 min and a specific gravity of about 0.7-1.0.

Most preferably, component (c) is selected from one of the group consisting of an ethylene-octene elastomer, an ethylene-butene elastomer, an ethylene-octene plastomer, an ethylene-butene elastomer, and mixtures thereof, wherein the main chains comprise primarily of ethylene and the side chains comprise primarily of octane, butene, or mixtures thereof. If the melt index is below about 20 g/10 min, dispersion of the fiber in the resin is insufficient and fiber clustering may occur on the surface of the product. In contrast, if the melt index of component (c) exceeds about 150 g/10 min, the impact resistance of the product is compromised.

TABLE 1

Tensile strength and melt index of ethylene-octene resin prepared by metallocene-catalyzed polymerization

| Grade | Melt index (g/10 min, at 190° C.) | Tensile strength (MPa) |
| --- | --- | --- |
| 8003 | 1.0 | 30.3 |
| 8585 | 2.5 | 25.5 |
| 8401 | 30.0 | 10.8 |

[DuPont Dow Elastomer's ethylene-octene (product name: Engage)]

As shown in Table 1, tensile strength and impact resistance tend to improve with decreasing melt index. Because of this observation, an ethylene-octene resin and/or an ethelene-butene resin polymerized with a metallocene-based catalyst and having a melt index of less than about 10 g/10 min has generally been employed in the art. In contrast, an elastomer, plastomer, or mixture thereof, otherwise referred to herein as component (c), having a melt index as measured at 190° C. ranging from about 20-150 g/10 min is used in preferred embodiments of the present invention. The higher melt indices of such resins are capable of inducing better impregnation of the long fiber-reinforcing material with components (a) and (c).

In preferred embodiments of the present invention, the ratio of the melt index as measured at 230° C. of component (a) to the melt index as measured at 190° C. of component (c) is kept in the range of about 0.5 to about 10. If the melt index ratio, i.e. $MI_{(a)}/MI_{(c)}$, is, less than 0.5, crosslinking may occur and the flow property is severely lowered, which in turn results in poor impregnation of the long fiber and the resin. In contrast, a melt index ratio of greater than 10 will result in poor impact resistance. Preferably, the long-fiber-reinforced polypropylene composition of the present invention comprises about 2-20 wt % of elastomer, plastomer, or a mixture thereof. If the content of component (c) is too low, i.e. less than about 2 wt %, impact resistance tends to be poor. In contrast, if the content of component (c) is too high, i.e. in excess of 20 wt %, rigidity tends to be poor. In light of the above, the appropriate content and composition of component (c) can be readily selected by one of skill in the art.

Generally in the present invention, the radical initiator is added to minimize or altogether eliminate the rigidity-lowering effects of adding component (c) to the crystalline polypropylene resin. With the addition of the radical initiator, impact resistance and rigidity are improved simultaneously. The radical initiator acts on the crystalline polypropylene structure in such a way as to promote polymerization of polypropylene units with units of component (c).

It should be noted that too low a content of radical initiator in the composition, i.e. less than 0.01 wt %, results in insufficient bond formation between elastomer and/or plastomer to the crystalline polypropylene, leading to very poor rigidity despite an improvement in impact resistance. However, if greater than 3 wt % of radical initiator is used, the crystalline polypropylene is fragmented so rapidly that the product may gel and undergo rapid and significant loss in rigidity.

Exemplary categories of radical initiators include peroxides, aliphatic azo compounds, organic metallic compounds, etc. Examples of specific radical initiators that can be employed for the present invention include t-butyl hydroperoxide, n-butyl-4,4-bis(t-butylperoxy)butane, 1,1-bis(t-butylperoxy)-3,3,5-trimethylcyclohexane, diisopropylbenzene hydroperoxide, t-butylperoxy-m-isopropylbenzene, t-butylperoxy acetate, 1,1-bis(t-butylperoxy)cyclohexane, 1,1,3,3-tetramethylbutyl peroxide, 1,1-bis(t-hexylperoxy)cyclohexane, 2,4-dichlorobenzoyl peroxide, t-butylperoxyisopropyl carbonate, dicumyl peroxide, t-butylcumyl peroxide, t-butylperoxydiisopropylbenzene, 2,5-dimethyl-2,5-bis(t-butylperoxy)hexyne-3, acetyl peroxide, isobutyl peroxide, 2,5-dimethyl-2,5-bis(t-butylperoxy)hexyne-3, octanoyl peroxide, 3,5,5-trimethylhexanoyl peroxide, benzoyl peroxide, dicumyl peroxide, m-toluoyl peroxide, lauroyl peroxide, t-butylperoxy isobutyrate, t-butylperoxy-2-ethyl hexanoate, t-butylperoxy laurate, t-butylperoxy benzoate, 2,2-bis(t-butylperoxy)octane, cumylperoxy octate, t-butylperoxymaleic acid, 2,5-dimethyl-2,5-bis(t-butylperoxy)hexane, di-t-butylperoxy isophthalate, decanoyl peroxide, 2,5-dimethyl-2,5-di(benzoylperoxy)hexane, 1,1-bis(t-butylperoxy)cyclododecane, cumene hydroperoxide, 2,5-dimethylhexane 2,5-dihydroperoxide, 1,1-bis(t-hexylperoxy)-3,3,5-trimethylcyclohexane, 2,5-dimethyl-2,5-bis(t-butylperoxy)hexane, 1,1-bis(t-butylperoxy)-3,3,5-trimethylbutyl peroxide, di-t-butyl peroxide, azobisbutyronitrile, cerium(IV) ion complex, 2,2'-azobis(2-cyanobutane), 2,2'-azobis(methylbutyronitrile), 2,2'-azobis(2-propanol), AcProl, AMBM, etc. In terms of cost-effectiveness, the peroxide is a most preferred initiator. On the other hand, aliphatic azo compounds are less susceptible to oxidation and are thus more stable in that respect.

The composition produced in this manner can undergo further processing into pellets using any of the methods known in the art. For example, the composition can be fed into an extruder and/or melt cutter, where it is melted and cut into pellets. Preferably, the major pellet axis length is comparable to the size of the long-fiber reinforcing material, which ranges from about 3 mm to about 50 mm. If the pellet axis length is shorter than 3 mm, the length of the long-fiber reinforcing material in the final product is shortened, which counteracts the purpose of the present invention by reducing the impact strength. In contrast, if the pellet length is too great, i.e. in excess of about 50 mm, improvement in rigidity or impact resistance cannot be attained due to blocking of the hopper during injection or extrusion, which leads to segregation. The pellet may theoretically adopt any shape of form. In exemplary embodiments of the present invention, the pellets are characterized by a circular or square-shaped cross-section. Preferably, the proportion of the cross-sectional length to the pellet major axis ranges from about 1:3 to about 1:50.

To optimize the benefits derived from the long-fiber-reinforcement, the composition of the present invention can be formed such that the fiber filaments of the long-fiber reinforcing material are aligned parallel to the major axis of the pellet of comparable length. This can be accomplished in a variety of ways known in the art. Exemplary techniques include: loosening the fiber bundle from the cluster of fiber filaments and impregnating and/or coating the fiber filaments with a thermoplastic polymer; commingling polypropylene fiber filaments with other organic or inorganic fiber filaments, loosening the mixed fiber bundle from the cluster of fiber filaments and impregnating and/or coating the fiber filaments to other organic or inorganic fiber with a thermoplastic polymer; heating the fiber bundle while adhering a polypropylene powder suspension to the fiber filaments; contacting a fiber bundle to a melt resin to impregnate it; adhering polyolefin powder to charged fiber filaments and impregnating by melting it; or impregnating a polypropylene resin dissolved in a solvent into fiber filaments and removing the solvent. The impregnation or coating step is performed by contacting the fiber filaments with the melt resin composition, comprising components (a), (b), and (c) for about 0.3-10 sec, preferably about 0.3-5 sec. This is a comparatively swift process given that conventional screw extrusion or kneading methods require at least 30 sec.

The door module of the present invention may be prepared from the above-described composition using any processing means known in the art. Exemplary processing techniques include injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, and gas compression molding. The door module of the present invention, or any article of a desired shape or design, can be readily formed using a method such as injection molding, low-pressure injection molding, extrusion compression molding, gas injection molding, foam injection molding, low-pressure gas injection molding, or low-pressure foam injection molding.

A schematic of a door module produced by injection-molding the long-fiber reinforced polypropylene composition according to an embodiment of the present invention is illustrated in FIG. 1. The door module is typically installed on the interior of a vehicle door where many different components, e.g window regulator, door motor, regulator channel, inside handle, speaker, door wire harness clip, etc., may be integrated.

The following examples are provided by way of illustration only and not by way of limitation. Those of skill in the art will readily recognize a variety of non-critical parameters that could be changed or modified to yield essentially similar results.

EXAMPLES

Preparation Example 1

Preparation of Propylene-based Long-fiber Reinforced Composition

Compositions of Examples 1-10, Comparative Example 2-3 and Comparative Examples 5-9 were prepared according to the specifications provided in Table 2 (see FIG. 2) by melting a crystalline polypropylene resin, an elastomer and/or a plastomer polymerized by a metallocene-based catalyst, a radical initiator [2,5-dimethyl 2,5-bis(t-butylperoxy)hexane] along with 2,000 ppm of a primary antioxidant (IGANOX 1010), 3,000 ppm of a secondary antioxidant (IGAFOS 168), 1,000 ppm of a primary UV stabilizer (hindered amine), 1,000 ppm of a secondary UV stabilizer (benzophenone), 1,000 ppm of a slip-type lubricant (stearic acid) and 11,000 ppm of a filler (talc & carbon black). Into an impregnation bath containing the resin composition was added a glass fiber filament cluster having a diameter of 17 µm, which had been surface-treated with aminosilane. After 1-3 sec of impregnation at 250° C., the strand in which the glass fiber filaments had been impregnated was cut into 12 mm-long pellets and dried.

In Examples 1, 3, 5 and 6, long-fiber reinforced polypropylene compositions comprising a glass fiber reinforcing material having an average length of 12 mm, a propylene homopolymer, a modified propylene-ethylene copolymer having an ethylene content of 8% and part of which has been grafted by maleic anhydride, an ethylene-octene elastomer having a specific gravity of 0.86 and polymerized by single-site catalysis, and a property enhancer or modifier were prepared into pellets.

In Example 2, the same materials were used as in Example 1, with the following variations. A propylene-ethylene copolymer having an ethylene content of 12% that has been grafted by maleic anhydride and an ethylene-butene elastomer having a specific gravity of 0.88 and polymerized by single-site catalysis were used instead.

In Example 4, the same materials were used as in Example 1, but with an added component, i.e. an ethylene-octene elastomer having a specific gravity of 0.913 that was polymerized by single-site catalysis.

In Example 7, the same materials were used as in Example 1, except a glass fiber reinforcing material having an average length of 8 mm was used instead.

In Example 8, the same materials were used as in Example 7, but with an added component, i. e. a propylene copolymer grafted by maleic anhydride.

In Example 9, the same materials were used as in Example 2, but with an increase in the content of the ethylene-butene elastomer having a specific gravity of 0.86 and polymerized by single-site catalysis.

In Example 10, the same materials were used as in Example 1, except for a change in the ratio of melt index to 10.0 using a crystalline polypropylene resin having a melt index of 200 (measured at 230° C.) and an ethylene-octene elastomer having a melt index of 20 (measured at 190° C.) and a specific gravity of 0.86 that was polymerized by single-site catalysis.

In Comparative Example 2, a long-fiber reinforced polypropylene composition comprising a glass fiber reinforcing material having an average length of 12 mm, a polypropylene homopolymer, a modified propylene-ethylene copolymer having an ethylene content of 8%, part of which have been grafted by maleic anhydride, and a performance enhancer or a property modifier were prepared into pellet.

In Comparative Example 3, the same materials were used as in Comparative Example 2, but with an additional component, i.e. an ethylene-propylene elastomer (EPM).

In Comparative Example 5, a long-fiber reinforced composition was prepared using an ethylene-octene elastomer which was polymerized by single-site catalysis and having a melt index of 11 (measured at 190° C.).

In Comparative Example 6, a long-fiber reinforced composition was prepared with a ratio of melt index of 12.8.

In Comparative Example 7, a long-fiber reinforced composition was prepared without the use of a radical initiator.

In Comparative Example 8, long-fiber reinforced composition was prepared using 3.2 wt % of a radical initiator.

In Comparative Example 9, a long-fiber reinforced composition was prepared using 25 wt % of an ethylene-octene elastomer that was polymerized by single-site catalysis.

Preparation Example 2

Preparation of Propylene-based Short-fiber Reinforced Composition

In Comparative Example 1 and Comparative Example 4, as shown in FIG. 2, a crystalline polypropylene resin, an elastomer and/or a plastomer prepared by metallocene-catalyzed polymerization and 2,000 ppm of a primary antioxidant (IGANOX 1010), 3,000 ppm of a secondary antioxidant (IGAFOS 168), 1,000 ppm of a primary UV stabilizer, 1,000 ppm of a UV stabilizer, 1,000 ppm of a slip-type lubricant and 11,000 ppm of a filler (talc & carbon black), and a performance enhancer or property modifier, were mixed with chopped 3 mm-glass fiber that had been fed from the side feeder of a twin-axis extruder at 230° C. for 40 sec. The mixture was squeezed out through the nozzle as a strand, which was then cut into 3 mm-long pellets and dried. Average glass fiber length of the pellet was measured and recorded as shown in FIG. 2.

In Comparative Example 1, a polypropylene-based short-fiber reinforced composition comprising a glass fiber reinforcing material having an average length of 0.7 mm, a polypropylene homopolymer, a modified polypropylene polymer, part of which has been grafted by maleic anhydride, an ethylene-propylene elastomer, and a performance enhancer or a property modifier were prepared into pellet.

In Comparative Example 4, a polypropylene-based short-fiber reinforced composition comprising a glass fiber reinforcing material having an average length of 0.65 mm, a polypropylene homopolymer, a modified polypropylene polymer, part of which has been grafted by maleic anhydride, an ethylene-propylene elastomer, and a performance enhancer or a property modifier were prepared into pellet.

Preparation Example 3

Injection Molding of Door Module

Door module was injection molded maintaining temperature inside the cylinder at 220° C., 245° C. and 260° C. (fore part, middle part and rear part, respectively) at an injection rate of about 40-70 mm/sec. Injection pressure was modulated to prevent sinking in the product. Cooling time in the mold was set at 30 sec.

Test Example 1

Performance Test of Impact Resistance of Door Module

The lower portion of the door module was fixed with a bolt to a jig having a width of 40 mm and a height of 100 mm. At the part of the door shield mold where the motor is typically installed, a 3.8 kg weight was dropped from various heights. Impact resistance was then measured by the impact energy (Joule) applied to the module. The results are provided in Table 2. The test standard was set such that a door module that can withstand an impact energy of at least 20 Joules is considered passing.

Test Example 2

Performance Test of Rigidity of Door Module

The lower part of the door module was fixed with a bolt to a jig having a width of 40 mm and a height of 100 mm. A 10 kg weight was suspended from the center of the lower part of the door shield mold and the amount of deformation (mm) of the module was measured. The results are provided in Table 2. The test standard was set such that a door module that undergoes a deformation length of 2.0 mm or less is considered passing.

As previously mentioned, a door module produced with the long-fiber reinforced polypropylene composition of the present invention has superior resistance to damage caused by external impact. Additionally, the superior rigidity afforded by the composition enables the door module to experience less deformation when subject to a high load. Thus, the door module has significantly improved side impact resistance and deformation resistance and is also lightweight and easy to install.

While the present invention has been described with reference to the particular illustrative embodiments, it is not to be limited to the foregoing embodiments. Those skilled in the art will appreciate that changes or modifications to the embodiments an be made without departing from the scope and spirit of the present invention.

What is claimed:

1. A long-fiber reinforced polypropylene composition comprising:
    (a) about 29-77 wt % of a crystalline polypropylene resin comprising about 50-100 wt % of a propylene homopolymer;
    (b) about 20-50 wt % of a long-fiber reinforcing material having an average fiber length of about 3-50 mm and an average diameter of about 4-30 μm;
    (c) about 2-20 wt % of an elastomer, a plastomer, or a mixture thereof having a melt index of about 20-150 g/10 min as measured at 190° C. and polymerized by a metallocene-based catalyst; and
    (d) about 0.01-3 wt % of a radical initiator, wherein the ratio of the melt index of the crystalline polypropylene resin as measured at 230° C. to the melt index as measured at 190° C. of the elastomer, the plastomer, or the mixture thereof is in the range of about 0.5 to about 10.

2. The long-fiber reinforced polypropylene composition of claim 1, which has the form of a pellet having a major axis length of about 3 mm to about 50 mm.

3. The long-fiber reinforced polypropylene composition of claim 2, wherein the fiber filaments of the long-fiber reinforcing material is aligned parallel to the major axis of the pellet.

4. The long-fiber reinforced polypropylene composition of claim 1, 2, or 3, wherein the crystalline polypropylene resin is a propylene homopolymer or a mixture of a propylene homopolymer and a propylene-ethylene copolymer.

5. The long-fiber reinforced polypropylene composition of claim 1, 2, or 3, wherein the long-fiber reinforcing material comprises at least one type of fiber filaments selected from the group consisting of glass fiber filaments, carbon fiber filaments, and inorganic fiber filaments.

6. The long-fiber reinforced polypropylene composition of claim 1, 2, or 3, wherein the crystalline polypropylene resin has a melt index ranging from about 10 g/10 min. to about 300 g/10 min.

7. The long-fiber reinforced polypropylene composition of claim 1, 2, or 3, wherein all or part of the crystalline polypropylene resin is modified by a modifier selected from the group consisting of an unsaturated carboxylic acid, an acid anhydride thereof, an organosilane compound, and a mixture thereof.

8. The long-fiber reinforced polypropylene composition of claim 7, wherein the modifier is one selected from the group consisting of aminosilane, epoxy silane, vinylsilane, methacryloxysilane, acrylic acid, methacrylic acid, maleic acid, itaconic acid, maleic anhydride, itaconic anhydride, citraconic anhydride, methyl acrylate, monomethyl maleate, acrylic acid amide, fumaric acid monoamide, amide, itaconic acid imide, and a mixture thereof.

9. The long-fiber reinforced polypropylene composition of claim 1, 2, or 3, wherein the elastomer prepared by metallocene-catalyzed polymerization is an ethylene-octene elastomer or an ethylene-butene elastomer having a specific gravity of about 0.7 to about 0.9.

10. The long-fiber reinforced polypropylene composition of claim 1, 2, or 3, wherein the plastomer prepared by metallocene-catalyzed polymerization is an ethylene-octene plastomer or an ethylene-butene plastomer having a specific gravity of about 0.9 to about 1.0.

11. The long-fiber reinforced polypropylene composition of claim 1, 2, or 3, wherein the radical initiator includes at least one compound selected from the group consisting of a peroxide, an aliphatic azo compound, and an organic metallic compound.

12. A door module manufactured by a process comprising: melting the long-fiber reinforced polypropylene composition of claim 1, 2 or 3 and processing the composition by any one method selected from the group consisting of injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, and gas compression molding.

* * * * *